(12) United States Patent
de Jong et al.

(10) Patent No.: US 6,623,172 B1
(45) Date of Patent: Sep. 23, 2003

(54) REMOVABLY MOUNTED FIBER OPTIC CONNECTOR AND ASSOCIATED ADAPTER

(75) Inventors: Michael de Jong, Fort Worth, TX (US); Ronald L. Mudd, Euless, TX (US); Markus A. Giebel, Hickory, NC (US); Scott E. Semmler, Watauga, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/310,579

(22) Filed: May 12, 1999

(51) Int. Cl.[7] ................................................ G02B 6/38
(52) U.S. Cl. ............................ 385/59; 385/65; 385/83
(58) Field of Search .............................. 385/71, 72, 76, 385/77, 78, 89, 58, 59, 60, 65, 83

(56) References Cited

U.S. PATENT DOCUMENTS

| | | | | |
|---|---|---|---|---|
| 4,824,197 A | * | 4/1989 | Patterson | 385/137 |
| 5,101,463 A | * | 3/1992 | Cubukciyan et al. | 385/72 |
| 5,263,105 A | * | 11/1993 | Johnson et al. | 385/72 |
| 5,363,459 A | * | 11/1994 | Hultermans | 385/60 |
| 5,367,594 A | * | 11/1994 | Essert et al. | 385/70 |
| 5,608,827 A | * | 3/1997 | Boscher et al. | 385/55 |
| 6,045,270 A | * | 4/2000 | Weiss et al. | 385/59 |
| 6,068,410 A | * | 5/2000 | Giebel et al. | 385/72 |
| 6,149,313 A | * | 11/2000 | Giebel et al. | 385/59 |
| 6,173,097 B1 | * | 1/2001 | Throckmorton et al. | 385/59 |
| 6,186,672 B1 | * | 2/2001 | Takizawa et al. | 385/85 |

* cited by examiner

*Primary Examiner*—Hemang Sanghavi
*Assistant Examiner*—Omar Rojas

(57) ABSTRACT

A connector is provided for use in fiber to the desk applications. The connector according to the present invention includes a main housing with a passageway therethrough, a ferrule assembly mountable to the main housing, and a splice member. The connector also includes a latch on at least one exterior surface of the main housing to engage a corresponding structure in an adapter sleeve.

38 Claims, 5 Drawing Sheets

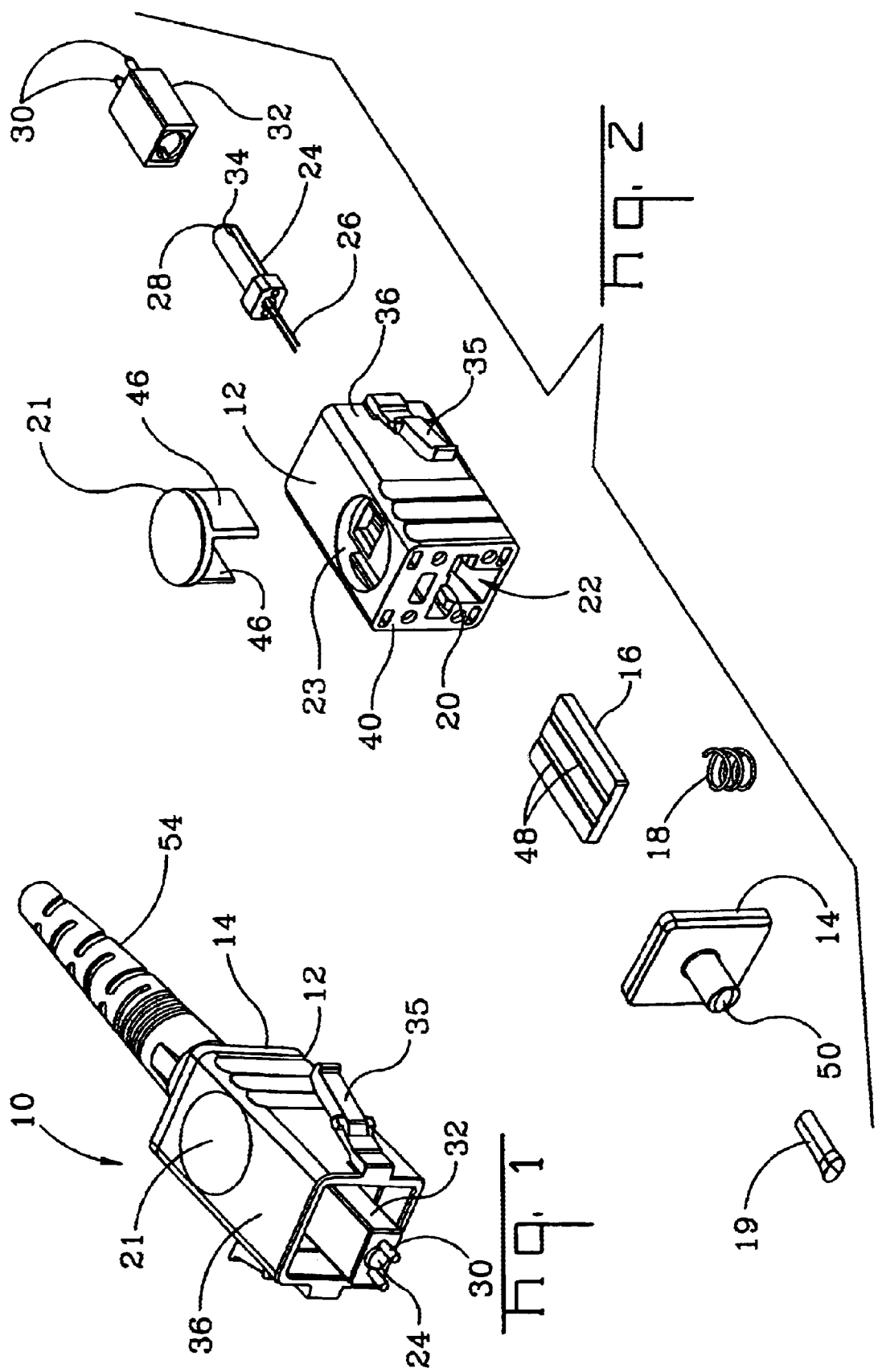

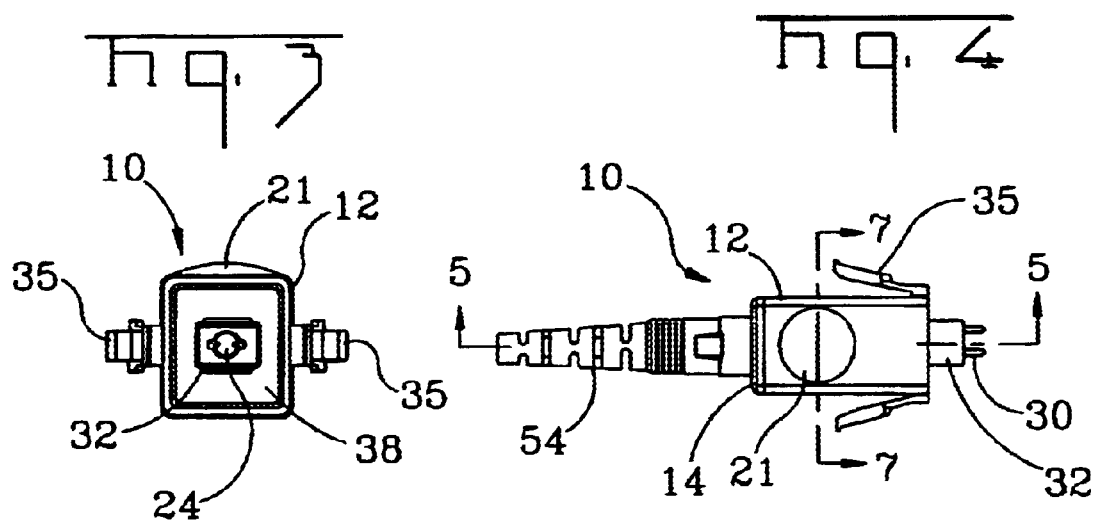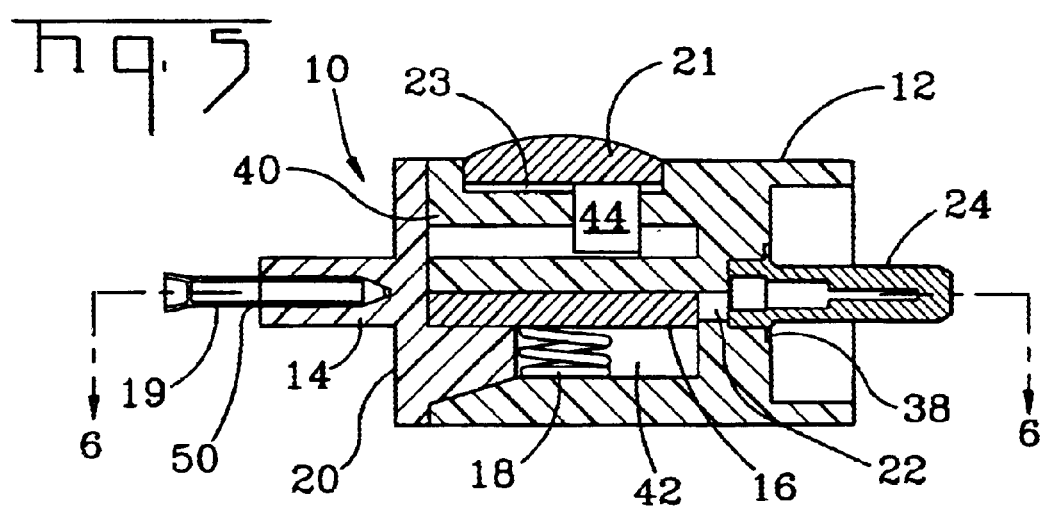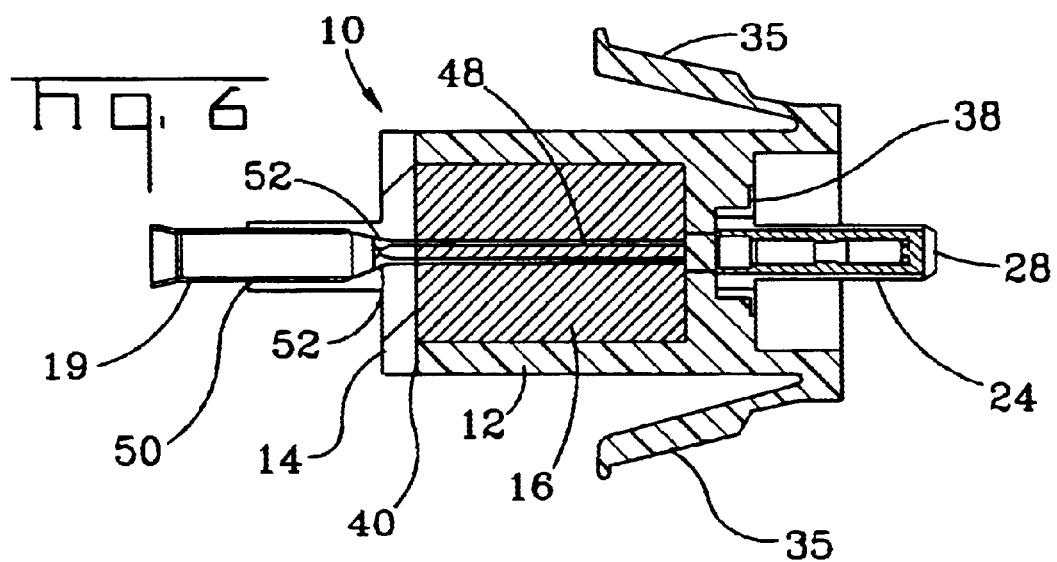

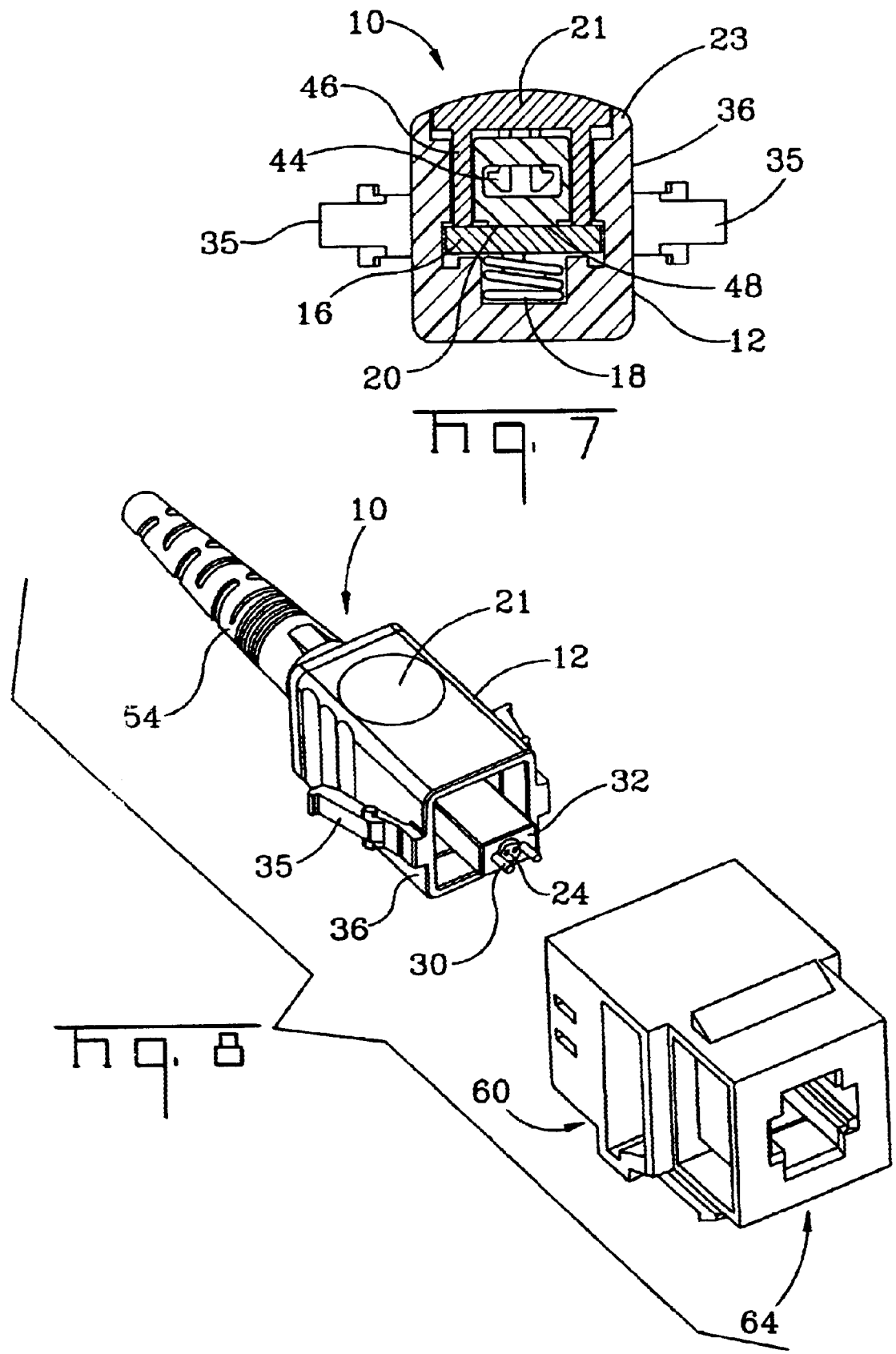

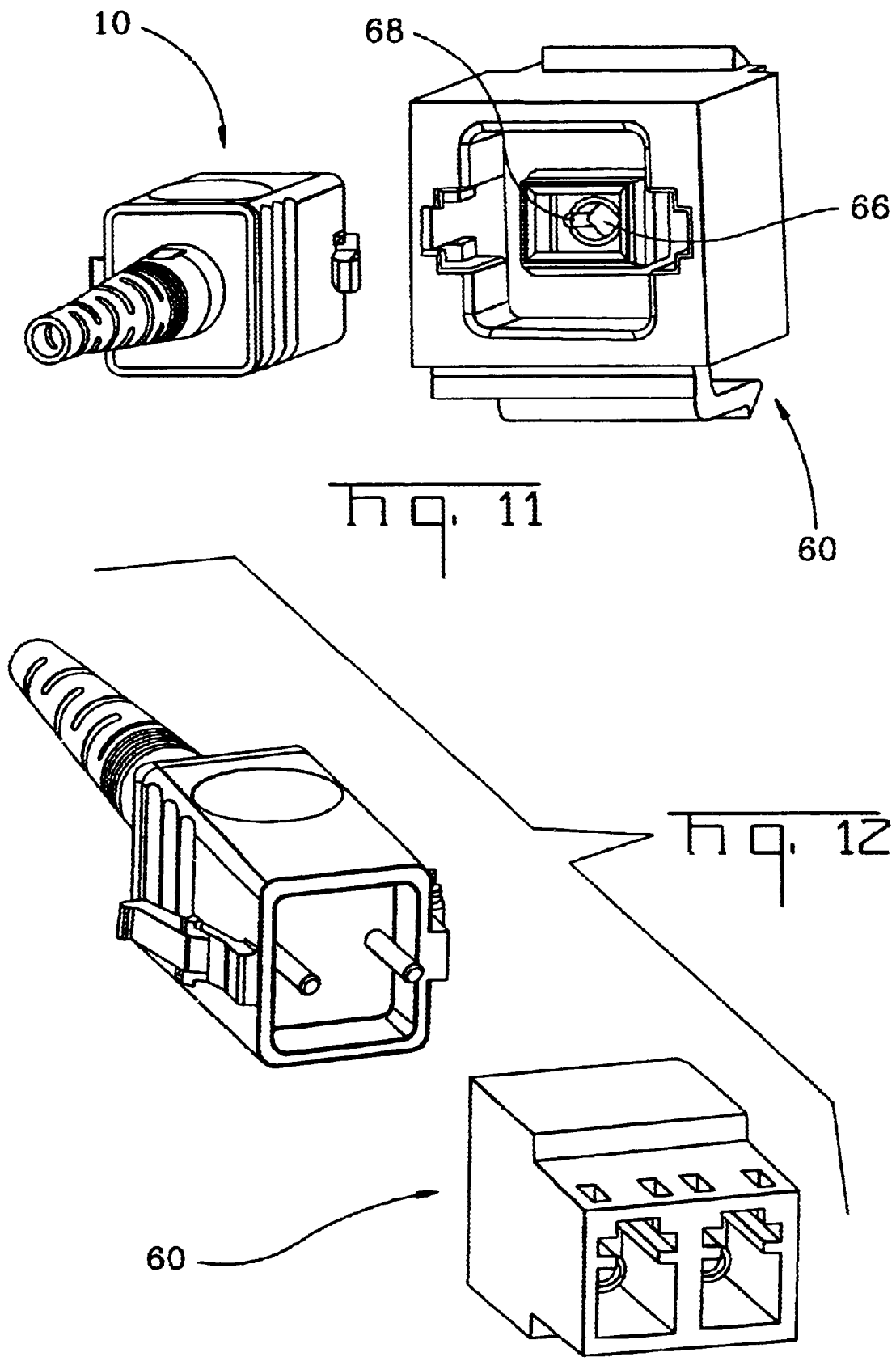

REMOVABLY MOUNTED FIBER OPTIC CONNECTOR AND ASSOCIATED ADAPTER

BACKGROUND

The present invention is directed to a fiber optic connector and an associated adapter. More specifically, the fiber optic connector and adapter are designed primarily for use in fiber-to-the-desk (FTTD) applications, where an inexpensive, quickly installable connector is needed. Typically, this connector is used in "behind the wall" applications. That is, the connector according to the present invention will be installed by the installers behind the connection point for the users of the FTTD applications (i.e., behind the wall, in gang boxes, panels, etc.) Since they are "behind the wall" and will not be subject to the typical stresses imparted on normal fiber optic connectors, they do not need the mechanical strength that is designed into normal fiber optic connectors. As a result, the connection point of the optical fibers with these connectors can be less substantial, and therefore easier to access and connect.

While there are other available connectors designed for in-wall applications (NTT's SC plug/jack connector and Siecor's Plug & Jack Connectors, for example), they typically terminate only one fiber, require an epoxy or other adhesive to mount, as well as require polishing of the ferrule end face. The installation cost and difficulty of such connectors is high, and the connection is permanent and does not easily allow changes once the connection is finished. Also, when multiple optical fibers are required in the FTTD application, the installer must not only install multiple connectors, but also a corresponding number of adapters, which further increases costs.

Thus, a need exists for an inexpensive connector that can be quickly and removably mounted on at least one optical fiber for use behind the wall.

SUMMARY OF THE INVENTION

Among the objects of the present invention is to provide a fiber optic connector that is installed on the ends of a fiber optic cable easily, is removable, and is mountable in conventional panels or cutouts. It is also an object of the present invention to provide a fiber optic connector and an associated sleeve to receive the fiber optic connector according to the present invention.

Other objects and advantages of the present invention will become apparent from the following detailed description when viewed in conjunction with the accompanying drawings, which set forth certain embodiments of the invention. The objects and advantages of the invention will be realized and attained by means of the elements and combinations particularly pointed out in the appended claims.

To achieve the objects and in accordance with the purposes of the invention as embodied and broadly described herein, the invention comprises a fiber optic connector for mounting on respective end portions of a plurality of optical fibers, the connector comprising a main housing having a passageway therethrough to receive the plurality of optical fibers, a ferrule assembly mountable in the main housing and in communication with the passageway, the ferrule assembly having a plurality of fiber bores for securing optical fiber stubs therein, and a splice member insertable into the main housing, the splice member configured to hold the optical fiber stubs and the end portions of the optical fibers in mechanical and optical alignment.

To achieve the objects and in accordance with the purposes of the invention as embodied and broadly described herein, the invention also comprises a fiber optic connector for mounting on an end portion of at least one optical fiber, the connector comprising, a main housing having a passageway therethrough to receive the at least one optical fiber, a ferrule assembly mountable in the main housing and in communication with the passageway, the ferrule assembly having at least one fiber bore for securing at least one optical fiber stub therein, and a splice member insertable into the main housing, the splice member configured to hold the at least one optical fiber stub and the end portion of the at least one optical fiber in mechanical and optical alignment.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and, together with the description, serve to explain the principles of the invention.

BRIEF DESCRIPTION OF THE DRAWINGS

FIG. 1 is a perspective of the connector according the present invention;

FIG. 2 is a exploded view of the connector of FIG. 1;

FIG. 3 is a front end view of the connector of FIG. 1;

FIG. 4 is a top view of the connector of FIG. 1;

FIG. 5 is a cross-sectional view of the connector of FIG. 1 along the line 5—5 in FIG. 4;

FIG. 6 is a cross-sectional view of the connector of FIG. 1 along the line 6—6 in FIG. 5;

FIG. 7 is a cross-sectional view of the connector of FIG. 1 along the line 7—7 in FIG. 4;

FIG. 8 is a perspective view of the connector of FIG. 1 with an adapter to be used with an MT-RJ connector;

FIG. 11 is a perspective view of the connector and adapter of FIG. 10 from the other side;

FIG. 12 is a perspective view of a different embodiment of the fiber optic connector according to the present invention to be used with an adapter for two LC connectors.

DETAILED DESCRIPTION OF THE INVENTION

Figure 9:
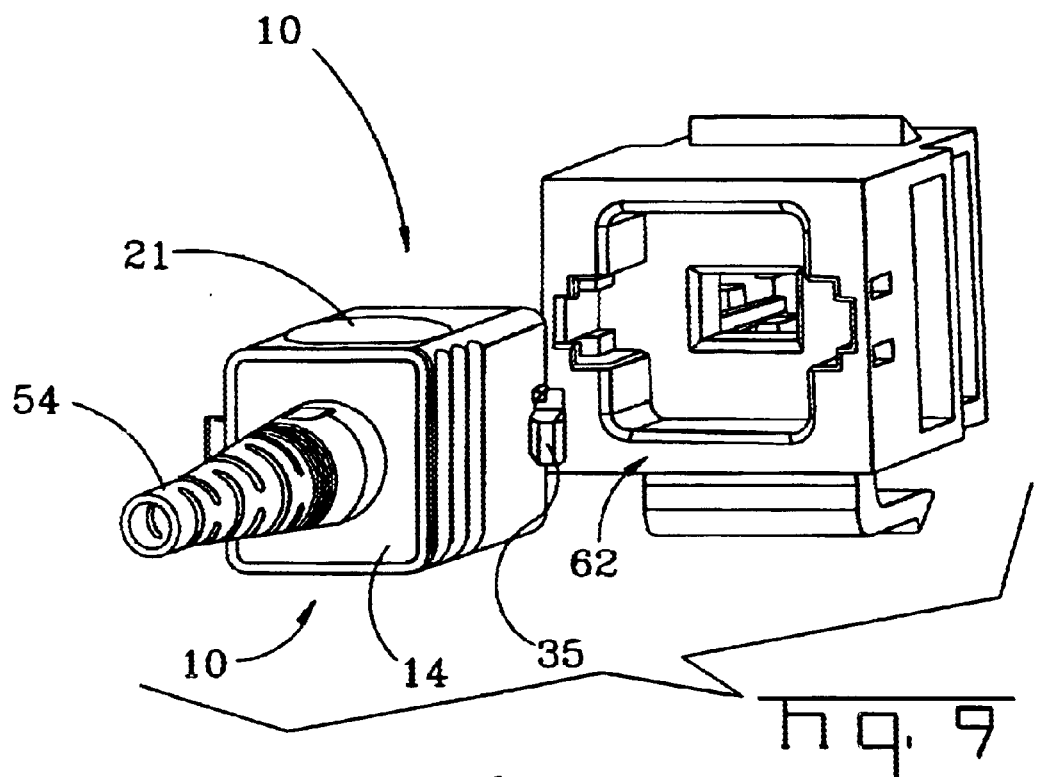
FIG. 9 is a perspective view of the connector and adapter of FIG. 8 from the other side.

A fiber optic connector 10 is shown in FIG. 1 and in an exploded perspective view in FIG. 2. Referring to FIG. 2, fiber optic connector 10 includes main housing 12 and a back plate or back member 14 to retain splice member 16 and the spring 18 in the main housing 12. A crimp tube 19 is insertable in the backside of back member 14 to hold the optical fiber cable relative to the connector 10. A button 21 inserted in opening 23 on the top of the housing 12 is used to depress splice member 16 down and away from a flat surface 20 inside passageway 22. Passageway 22 extends through main housing 12. See FIG. 5. Splice member 16 is resiliently pressed upward against the flat surface 20 in housing 12 by a spring 18. Spring 18 is shown as a cylindrical spring, but could be any type of a resilient element including a leaf spring.

A ferrule assembly 24 (which may be of any configuration, although a DC ferrule made by Siecor Corp. of Hickory, N.C. is shown) is inserted into the front part 38 of the housing 12. Preferably, fiber optic stubs 26, which will mechanically and optically connect with the optical fibers from the cable, are secured within bores of the ferrule assembly 24, and then the front face 28 of ferrule assembly 24 is polished. The fiber optic connector 10 also includes, in this preferred embodiment, two guide pins 30 and a ferrule/guide pin jacket 32 to hold the guide pins in the side grooves 34 of the ferrule assembly 24. It should be understood however, that the jacket 32 is not necessary and can be replaced by any structure (e.g., an o-ring, a tie, etc.) that would keep the pins 30 aligned in the grooves 34 on either side of the ferrule assembly 24. Preferably, the ferrule assembly 24 is fixed in the front portion 38 of the main housing 12 by an adhesive, such as epoxy or an equivalent. See, e.g., FIGS. 5 and 6. However, it may also be possible that the housing 12 and ferrule assembly 24 be of a unitary construction.

Now referring to the cross sections of the fiber optic connector 10 as shown in FIGS. 5–7, the ferrule assembly 24, typically with fiber optic stubs 26 already in place, is mounted in the front portion 38 of the main housing 12. A rearward portion of the ferrule assembly 24 is in communication with passageway 22. Splice member 16 is supported by the spring 18 in the passageway 22, which extends from the front portion 38 behind ferrule assembly 24 through to the rearward portion 40 of main housing 12. As shown in FIGS. 5 and 7, spring 18 biases the splice member 16 against the top surface 20 of main housing 12 to hold the fiber optic stubs 26 and the optical fibers in mechanical and optical alignment. In FIGS. 4–6, back member 14 is shown attached to the rear portion 40 of main housing 12. As can be seen in these figures, the spring element 18 is in an opening 42 adjacent to and in communication with the passageway 22. Button 21 is shown in opening 23 in main housing 12, and in conjunction with FIG. 7, it can be seen that two clip members 44 engage an inner portion of main housing 12 to prevent the button 21 from being lifted or falling out of main housing 12. Additionally, as can be seen in FIG. 7, button 21 has two downward projecting legs 46 to engage and depress the splice member 16, thereby allowing optical fibers to be inserted between the upper surface 20 and the grooves 48 (see FIG. 6) in the splice member 16. The button 21 when depressed moves the splice member 16 only 100 μm, a sufficient distance to allow the optical fibers to be inserted into the grooves 48, but not so as to allow them to be inserted anywhere else in connector 10. This arrangement ensures that the optical fibers will be in mechanical and optical contact with the fiber optic stubs 26.

In the embodiment shown in the figures, the grooves are shown in splice member 16. However, it is possible for the grooves 48 to also be formed in either the flat upper surface 20 in the main housing 12 or in both the upper surface 22 of the main housing 12 and in the splice member 16 in order to provide a channel for the optical fibers. Although not shown in FIG. 6, the optical fiber stubs 26 would extend rearwardly from the ferrule assembly 24 about half the distance to the back member 14 along the grooves 48 in splice member 16.

As shown in detail in FIG. 6, the back member 14 has an opening 50 that is bifurcated into two openings 52 to receive the optical fibers from the optical cable (not shown). In the preferred embodiment in which the ferrule assembly 24 is a DC ferrule, the back member 14 has two fiber bores 52, which correspond to the two grooves 48 in the splice member 16 and bores in ferrule assembly 24. Other ferrule assemblies having a differing number of fiber bores would have a corresponding number of grooves 48 in the splice member 16, or upper surface 20 of the housing 12, and back member 14. Alternatively, the fiber bores 52 could be located in elements other than the back member 14. For example, the bores 52 could be at the front end of crimp tube 19 or on the back end of splice member 16 and/or upper surface 20 of the main housing 12. The strain relief boot 54 of FIGS. 1, 4, and 8–12 are not shown in FIGS. 5 and 6 so that the crimp tube can be clearly seen.

As seen in FIGS. 1, 3, and 4, the fiber optic connector 10 presents a configuration that mimics the MT-RJ configuration. However, as can be seen from these figures, the fiber optic connector 10 includes two latches 35 on the outside surface 36 of the fiber optic connector 10 to allow it to engage an associated adapter, shown in FIGS. 8–12, rather than the standard MT-RJ latch. As discussed more fully below, this allows the user to change the polarity.

FIGS. 8–12 show fiber optic connector 10 of the present invention with an associated adapter 60. Adapter 60 is configured on a first side 62 to engage and hold fiber optic connector 10 in association with latches 35. In FIGS. 8 and 9 second side 64 of adapter 60 is configured to receive a MT-RJ type connector. (The internal configuration of the second side 64 is described in detail in copending application Ser. No. 09/118,440, assigned to same assignee as the present invention, the contents of which are incorporated herein by reference.) As the ferrule assembly 24 and fiber optic connector 10 in FIG. 8 has guide pins, the MT-RJ connector (not shown) that would be mated in FIG. 8 would not need the guide pins. Conversely, if the MT-RJ connector had alignment pins, then connector 10 would not need to have the pins. Typically, the connector mounted behind the wall, connector 10 in this application would already have alignment pins installed and the user's connector would not, and could not, have alignment pins.

The preferred outer configuration adapter 60 is configured such that it will fit a standard RJ-45 keystone footprint faceplate. Therefore, adapter 60 could be inserted into the faceplate by the installer, with second side 64 extending outward towards the desk or end user. The installer would then insert fiber optic connector 10 into first side 62 to provide a fiber connection at the desk or at the wall. Additionally, although not shown in the figures, the second side 64 of the adapter could come in to the wall surface at angles other than 90°, e.g., 45°, 30°, etc. The adapter 60 could also be configured to fit other standard openings, provided the openings allowed the adapter to have sufficient internal space to receive the desired connectors.

Figure 10:
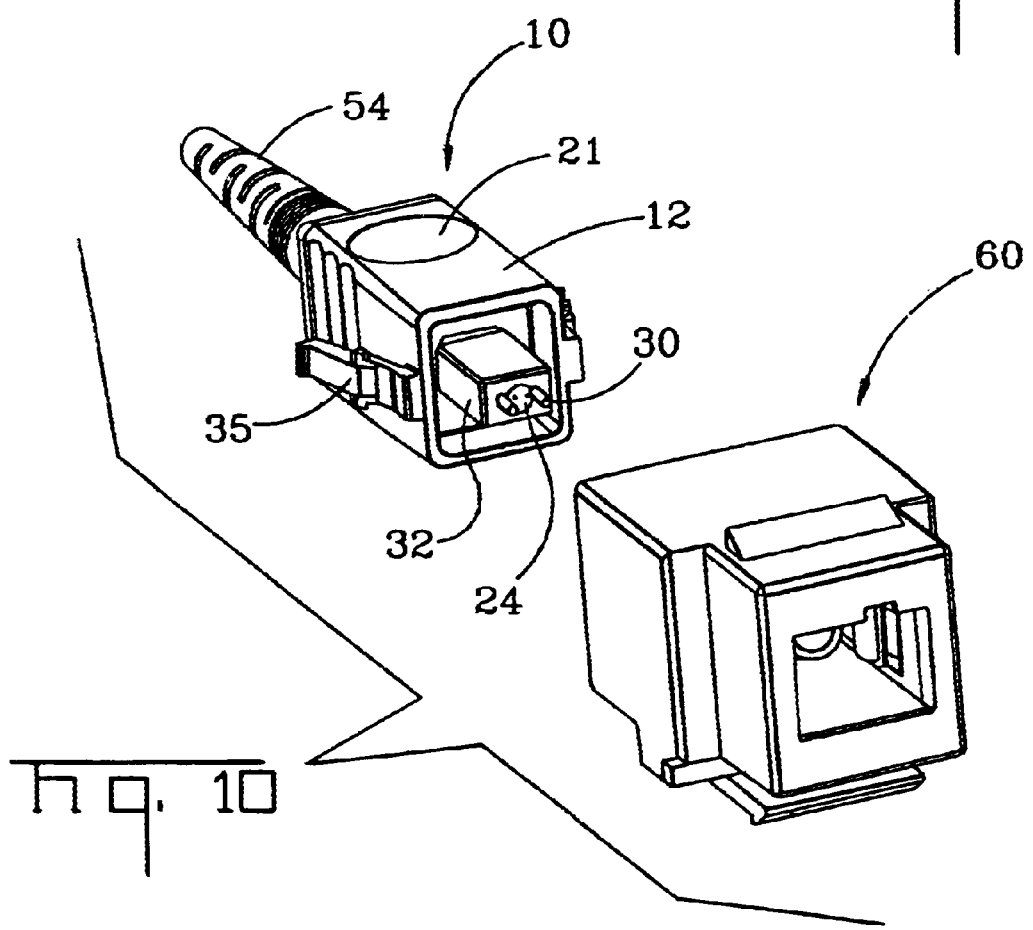
FIG. 10 is a perspective view of the connector of FIG. 1 with an adapter to be used with an SC-DC connector.

FIGS. 10 and 11 illustrate the fiber optic connector 10 with an adapter 60 that is configured to have a DC ferrule from Siecor Corp. inserted on the second side of the adapter. As can be seen in FIG. 11, the adapter 60 has a round opening 66 in the center to allow the DC ferrule (see FIG. 2) with two semi-circular slots 68. The guide pins 30 on each side of the connector 10 align in slots 68, and in conjunction with the opening 66, align the ferrule assembly 24 in the adapter 60 to mate with a connector inserted from the other side of the adapter. It should be noted that fiber optic connector 10 can be inserted in one of two directions. As can be seen from FIG. 4, fiber optic connector 10 is symmetrical about the line for the cross section of FIG. 5. Therefore, the installer could, in effect, reverse the polarity of the connection by simply turning fiber optic connector over 180° (with the button 21 facing downward rather that upward) and plugging it back in to the first side 62. However, the normal installation is with the button 21 being upward, or at least using the button 21 as the reference point. Although not shown, a mark or indicator could be included on one surface of the adapter 60 to indicate the correct orientation for the user. The person installing the connector 10 would then know how to orient connector 10 to assist the user in achieving the correct polarity.

FIG. 12 shows yet another embodiment of adapter 60 as well as a new configuration for the front of fiber optic connector 10. In this embodiment, two is individual ferrules are secured into the front surface of the main housing 12 rather than a single dual fiber ferrule as shown in the preferred embodiment. The remainder of the fiber optic connector 10 will be the same except the grooves in the splice member 16 and/or the upper surface 20 of passageway 22 would be further apart to coincide with the wider-spaced ferrules of this embodiment. The front side 64 of adapter 60 in FIG. 10 corresponds to the LC connector, sold by Lucent Technologies, Inc.

We claim:

1. A fiber optic connector for mounting on respective end portions of a plurality of optical fibers, the connector comprising:
   a main housing having a passageway therethrough to receive the plurality of optical fibers;
   a ferrule assembly mountable in the main housing and in communication with the passageway, the ferrule assembly having a plurality of fiber bores for securing optical fiber stubs therein;
   a splice member insertable into the main housing, the splice member configured to hold the optical fiber stubs and the end portions of the optical fibers in mechanical and optical alignment; and
   a resilient member disposed between the splice member and the main housing to bias the splice member against the housing for holding the optical fibers and optical fiber stubs in alignment.

2. The fiber optic connector according to claim 1, further comprising a back member securable to a rear portion of the main housing to retain the splice member within the main housing.

3. The fiber optic connector according to claim 2, wherein the back member has a opening therethrough to receive a fiber optic cable, the opening having along at least a portion of its length a plurality of channels, the plurality of channels corresponding to the plurality of optical fibers and optical fiber stubs.

4. The fiber optic connector of claim 1, wherein the passageway in the main housing has a flat upper surface and the splice member has a plurality of grooves for aligning the optical fibers, the resilient member being a spring for biasing the splice member against the flat upper surface in the housing.

5. The fiber optic connector according to claim 1, further comprising a button, the button disposed in the housing and configured to move the splice member away from the housing when depressed to allow the optical fibers to be inserted into the fiber optic connector.

6. The fiber optic connector according to claim 2, wherein the splice member has a plurality of grooves extending from a first end to a second end, the first end being arranged adjacent to the back member and the grooves at the first end having an enlarged portion at the first end to assist the optical fibers in locating the grooves.

7. The fiber optic connector according to claim 1, wherein the ferrule is an MT-RJ ferrule.

8. The fiber optic connector according to claim 1, wherein the ferrule is a DC ferrule.

9. The fiber optic connector according to claim 1, wherein the resilient member is cylindrical spring.

10. The fiber optic connector according to claim 1, wherein the resilient member is a leaf spring.

11. The fiber optic connector according to claim 1, wherein the splice member is smooth and the main housing has a plurality of grooves in the passageway for aligning the optical fibers and optical fiber stubs.

12. The fiber optic connector according to claim 1, wherein the splice member and the passageway each have grooves for aligning the optical fibers and optical fiber stubs.

13. The fiber optic connector according to claim 2, wherein fiber optic stubs extend rearwardly from ferrule assembly and the ferrule assembly has a polished endface.

14. The fiber optic connector according to claim 1, wherein optical fibers and fiber optic stubs are multimode fibers.

15. The fiber optic connector according to claim 1, wherein optical fibers and fiber optic stubs are single mode fibers.

16. The fiber optic connector according to claim 1, further comprising a latch on at least one exterior surface of the main housing to engage a corresponding structure in an adapter sleeve.

17. The fiber optic connector according to claim 1, further comprising a latch on two opposing sides of the main housing to engage a corresponding structure in an adapter sleeve, the main housing being insertable in the adapter in at least two different orientations.

18. The fiber optic connector according to claim 1, further comprising:
   an adapter sleeve for optically joining the fiber optic connector with a second connector, the adapter being mountable in an outlet and defining a passageway extending between a first end and a second end, the first end being configured to receive the ferrule assembly of the fiber optic connector and the second end being configured to receive the second connector, the second connector having any type of configuration.

19. The fiber optic connector according to claim 18, wherein the second end of the adapter sleeve is configured to receive a connector of the type of at least one of SC, ST, SC-DC, MT-RJ, LC, and MTP.

20. A fiber optic connector for mounting on an end portion of at least one optical fiber, the connector comprising:
   a main housing having a passageway therethrough to receive the at least one optical fiber;
   a ferrule assembly mountable in the main housing and in communication with the passageway, the ferrule assembly having at least one fiber bore for securing at least one optical fiber stub therein; and
   a splice member insertable into the main housing, the splice member configured to hold the at least one optical fiber stub and the end portion of the at least one optical fiber in mechanical and optical alignment; and
   a resilient member disposed between the splice member and the main housing to bias the splice member against the housing for holding the optical fibers and optical fiber stubs in alignment.

21. A fiber optic connector for mounting on an end portion of at least two optical fibers, the connector comprising:
   a main housing having a passageway therethrough to receive the at least two optical fibers;
   a ferrule assembly in the main housing and in communication with the passageway, the ferrule assembly having at least two fiber bores for securing a corresponding number of optical fiber stubs therein; and
   a latch on at least one side of the main housing to engage a corresponding structure in an adapter sleeve, the main housing being insertable in at least two different orientations in the adapter sleeve.

22. A fiber optic connector for mounting on respective end portions of a plurality of optical fibers, the connector comprising:

a main housing having a passageway therethrough to receive the plurality of optical fibers, the passageway having a flat upper surface;

a ferrule assembly mountable in the main housing and in communication with the passageway, the ferrule assembly having a plurality of fiber bores for securing optical fiber stubs therein;

a splice member insertable into the main housing, the splice member having a plurality of grooves to hold the optical fiber stubs and the end portions of the optical fibers in mechanical and optical alignment; and a spring member disposed between the splice member and the main housing to bias the splice member against the flat upper surface in the housing and to hold the optical fibers and optical fiber stubs in alignment.

23. The fiber optic connector according to claim 22, further comprising a button, the button disposed in the housing and configured to move the splice member away from the flat upper surface when depressed to allow the optical fibers to be inserted into the passageway through the back member.

24. The fiber optic connector according to claim 22, wherein the spring member is a cylindrical spring.

25. The fiber optic connector according to claim 22, wherein the spring member is a leaf spring.

26. A fiber optic connector for mounting on an end portion of at least one optical fiber, the connector comprising:

a main housing having a passageway therethrough to receive at least one optical fiber;

a ferrule assembly mountable in the main housing and in communication with the passageway, the ferrule assembly having at least one fiber bore for securing at least one optical fiber stub therein;

a splice member insertable into the main housing, the splice member configured to hold the at least one optical fiber stub and the end portion of the at least one optical fiber in mechanical and optical alignment;

a resilient member disposed between the splice member and the main housing to bias the splice member against the housing for holding the at least one optical fiber and the at least one optical fiber stub in alignment; and a button, the button disposed in the housing and configured to move the splice member, thereby allowing the at least one optical fiber to be inserted into the connector.

27. The fiber optic connector according to claim 26, further comprising a back member securable to a rear portion of the main housing to retain the splice member within the main housing.

28. The fiber optic connector according to claim 27, wherein the back member has a opening, the opening having along at least a portion of its length a plurality of channels, the plurality of channels corresponding to a plurality of optical fibers and optical fiber stubs.

29. The fiber optic connector according to claim 27, wherein the passageway in the main housing has a flat upper surface and the splice member has at least one groove for aligning the at least one optical fiber.

30. The fiber optic connector according to claim 27, wherein the splice member has at least one groove extending from a first end to a second end, the first end being arranged adjacent to the back member and the at least one groove at the first end having an enlarged portion at the first end to assist the at least one optical fiber in locating the at least one groove.

31. The fiber optic connector according to claim 26, wherein the ferrule is an MT-RJ ferrule.

32. The fiber optic connector according to claim 26, wherein the ferrule is a DC ferrule.

33. The fiber optic connector according to claim 26, wherein the resilient member is a cylindrical spring.

34. The fiber optic connector according to claim 26, wherein the splice member is smooth and the main housing has at least one groove in the passageway for aligning the at least one optical fiber and the at least one optical fiber stub.

35. The fiber optic connector according to claim 26, wherein the splice member and the passageway each have at least one groove for aligning the at least one optical fiber and the at least one optical fiber stub.

36. The fiber optic connector according to claim 26, further comprising a latch on at least one exterior surface of the main housing to engage a corresponding structure in an adapter sleeve.

37. The fiber optic connector according to claim 36, further comprising a latch on two opposing sides of the main housing to engage a corresponding structure in an adapter sleeve, the main housing being insertable in the adapter in at least two different orientations.

38. A fiber optic connector for mounting on respective end portions of a plurality of optical fibers, the connector comprising:

a main housing having a passageway therethrough to receive the plurality of optical fibers;

a ferrule assembly mountable in the main housing and in communication with the passageway, the ferrule assembly having a plurality of fiber bores for securing optical fiber stubs therein;

a splice member insertable into the main housing, the splice member having a plurality of grooves extending from a first end to a second end for holding the optical fiber stubs and the end portions of the optical fibers in mechanical and optical alignment, the first end being arranged adjacent to the back member and having an enlarged portion to assist the optical fibers in locating the grooves; and a resilient member disposed between the splice member and the main housing to bias the splice member against the housing for holding the optical fibers and optical fiber stubs in alignment.

* * * * *